Figure 1:
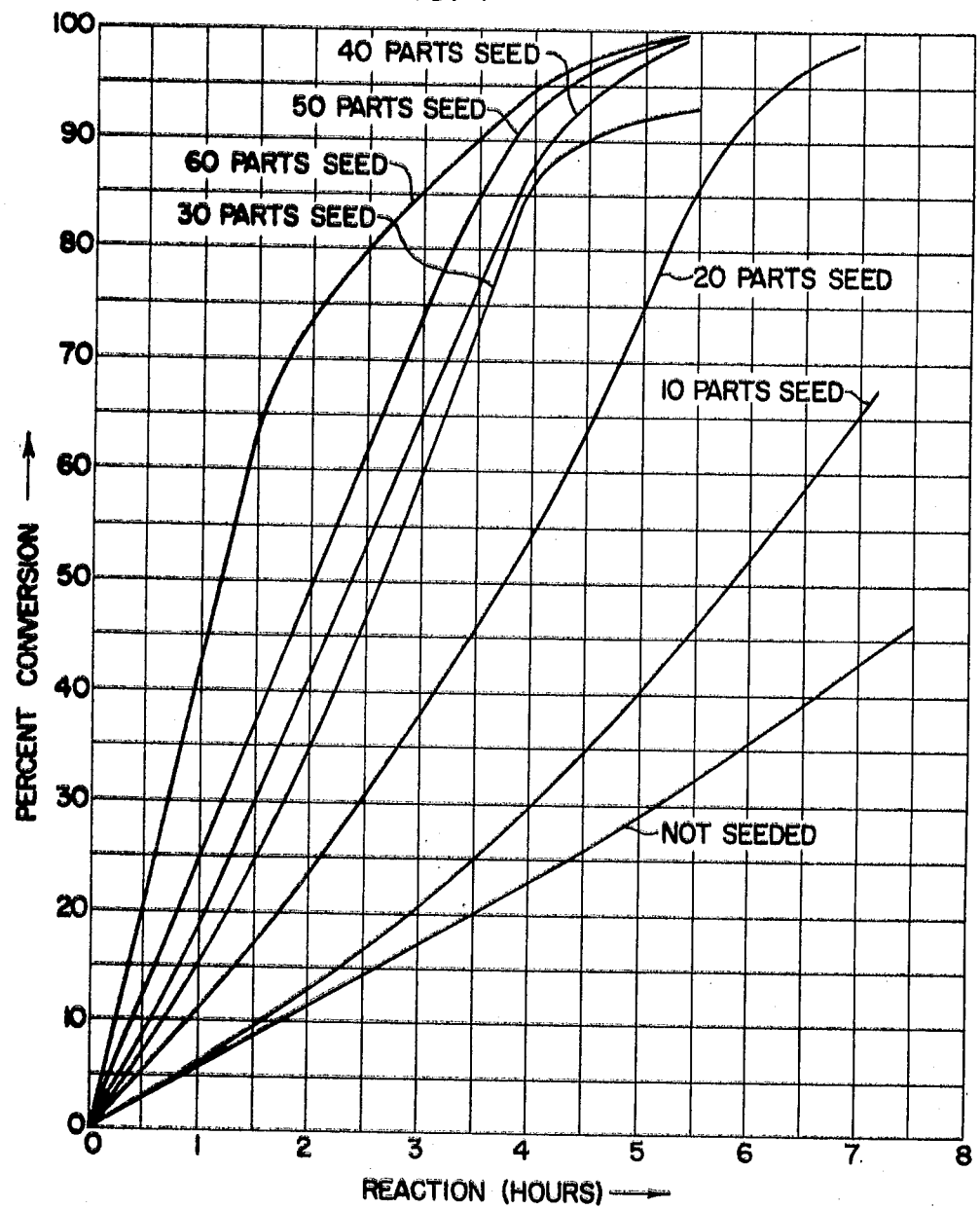

United States Patent [19]
Duke et al.

[11] 3,742,092
[45] June 26, 1973

[54] METHACRYLONITRILE POLYMERIZATION PROCESS

[75] Inventors: June T. Duke, Chagrin Falls; Dorothy C. Prem, Warrensville Heights, both of Ohio

[73] Assignee: The Standard Oil Company, Cleveland, Ohio

[22] Filed: July 14, 1971

[21] Appl. No.: 162,540

[52] U.S. Cl. 260/880 R, 260/29.6 AN, 260/29.6 RB, 260/29.7 VA, 260/879
[51] Int. Cl. .... C08f 15/22, C08f 19/06, C08f 19/08
[58] Field of Search.......................... 260/879, 880

[56] References Cited
UNITED STATES PATENTS
3,397,165   8/1968   Goodman et al. .............. 260/29.7
3,588,737   6/1971   Duk et al. ........................... 260/879

*Primary Examiner*—Harry Wong, Jr.
*Assistant Examiner*—William F. Hamrock
*Attorney*—John F. Jones et al.

[57] ABSTRACT

A polymerization process is described in which impact resistant methacrylonitrile homopolymers and copolymers are prepared in the presence of a diene rubber by free radical polymerization at improved rates by conducting the polymerization in aqueous emulsion in the presence of some preformed seed polymer having small particle size.

7 Claims, 5 Drawing Figures

METHACRYLONITRILE POLYMERIZATION PROCESS

The present invention relates to an improved process for the polymerization of methacrylonitrile in the presence of a diene rubber and more particularly pertains to a process for the rapid polymerization and copolymerization of methacrylonitrile in the presence of a diene rubber which includes the presence of certain other preformed polymer particles in the polymerization mixture.

The homopolymers and copolymers of methacrylonitrile as well as rubber modified, impact resistant homopolymers and copolymers of methacrylonitrile are well known to those skilled in the art. It is also well known that methacrylonitrile is a relatively slow reacting monomer in free radical addition polymerization when compared with other common polymerizable vinyl monomers such as acrylonitrile, styrene, vinyl acetate, ethyl acrylate, methyl methacrylate, etc. The homopolymers and copolymers of methacrylonitrile and rubber modified homopolymers and copolymers of methacrylonitrile are known to be useful for a wide variety of purposes including fibers, rubbers, adhesives, engineering materials, container materials and the like. One serious drawback to the use of methacrylonitrile homopolymers, copolymers and rubber modified homopolymers and copolymers is the fact that methacrylonitrile is not a highly reactive species in free radical vinyl polymerization and because of its relatively low reactivity considerable time is consumed in their production and this adds to their cost.

It is therefore an object of this invention to provide a process for preparing diene rubber modified methacrylonitrile homopolymers and copolymers by an improved free radical addition polymerization process which occurs at a much more rapid rate than do the prior art processes when they are applied to this monomer. That this and other objects have been accomplished by the present invention will become apparent from the following description and examples.

We have discovered that methacrylonitrile can be homopolymerized or copolymerized in the presence of a preformed diene rubber at a relatively rapid rate when there are also included in the polymerization mixture some small particles of a certain type of preformed or "seed" polymer which may include methacrylonitrile homopolymer or copolymer.

Monomers which can be used in minor proportions in the monomer component in the instant process in addition to the diene rubber and seed polymer and essential monomer, methacrylonitrile, which is present as the major proportion of the monomer component, include acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate, and the like; the vinyl aromatics such as styrene, alpha-methyl styrene, vinyl toluene, the vinyl xylenes, the vinyl naphthalenes, isopropenyl benzene, and the like; vinyl amides such as acrylamide, methacrylamide, N-methyl acrylamide, vinyl benzamide, N-vinyl pyrrolidone, maleimide, and the like; the vinyl halides such as vinyl chloride, vinyl bromide, vinyl fluoride, vinylidene chloride, vinylidene fluoride, dichloro difluoro ethylene, tetrafluoroethylene, the halo styrenes, and the like; olefins such as ethylene, propylene, isobutylene, butene-1, diisobutylene, and the like. Most preferred are methyl acrylate, methyl methacrylate and styrene and mixtures thereof.

The foregoing monomers are also useful in the production of seed latices used in the process of this invention.

The diene rubber latices preferred as rubber modifiers in the process of this invention are those having an average particle size of from about 800 to about 2,000 A.

The diene rubbers useful in this invention are rubbery polymers of one or more conjugated diene monomers including butadiene-1,3, isoprene, chloroprene, bromoprene, cyanoprene, 2,3-dimethyl butadiene-1,3, 2-ethyl-butadiene-1,3, 3,3-diethyl-butadiene-1,3, and the like and others. Most preferred are butadiene and isoprene because of their ready availability and their excellent copolymerization properties.

Preferred diene rubbers are those rubbery polymers of a conjugated diene and optionally a comonomer selected from the group consisting of a vinyl aromatic monomer such as styrene and an olefinic nitrile having the structure

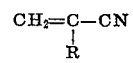

wherein R is hydrogen, a lower alkyl group having from one to four carbon atoms, or a halogen, said rubber containing from 50 to 100 percent by weight of polymerized conjugated diene and from one to 50 percent by weight of comonomer.

The rubbery conjugated diene polymer preferred is a copolymer of butadiene and olefinic nitrile containing more than 50 percent by weight of the conjugated diene, and more preferably it contains from 60 to 90 percent by weight of polymerized butadiene and from 10 to 40 percent by weight of polymerized olefinic nitrile, and the preferred olefinic nitriles are acrylonitrile and methacrylonitrile.

In the process of this invention it is preferred that from about one to 40 and preferably one to 20 parts of the diene rubber be used for each 100 parts by weight of methacrylonitrile or methacrylonitrile-comonomer mixture. It has generally been found that as the relative amount of the rubbery copolymer of butadiene and olefinic nitrile is increased in the final resin the impact strength increases and the gas and vapor barrier properties of the resin decrease somewhat. It is generally preferred to use just enough of the rubber diene copolymer to impart the desired impact strength to the final resin and to retain optimum gas and vapor barrier properties at the same time.

The preferred method of polymerization in our process is aqueous emulsion polymerization in the presence of the rubber latex, the seed latex, an emulsifier and a free radical generating polymerization initiator in the range of from about 15 to 60 percent total solids and preferably to high conversion, i.e., about 50 percent or higher conversion of monomers to polymer, at a temperature in the range of from about 0° C to 100° C in the substantial absence of molecular oxygen.

Suitable emulsifiers include fatty acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; aralkyl sulfonates such as sodium isopropyl benzene sulfonate, sodium isobutyl naphthalene sulfonate, and alkali metal salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinamate, the polyalkyl and polyalkaryl alkoxyalkylene phosphonate acids and salts more fully described in U.S. Pat. No. 2,853,471, and the like; the so-called cationic emulsifiers such as the salts of strong inorganic acids and organic bases containing long carbon chains, for instance, lauryl amine hydrochloride, the hydrochloride of diethyl aminoethyl decyl amine, trimethyl cetyl ammonium bromide, dodecyl trimethyl ammonium bromide, the diethyl cyclohexylamine salt of cetyl sulfonic esters. Nonionic emulsifiers may also be used and these include the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latices embodied herein for improved stability.

The polymerization catalyst or initiator, usually required for satisfactory polymerization rate, may be any of those commonly employed for the polymerization of vinyl monomers and include the various peroxygen compounds such as hydrogen peroxide, benzoyl peroxide, pelargonyl peroxide, t-butyl peroxypivalate, cumene hydroperoxide, tertiary butyl hydroperoxide, tertiary butyl perbenzoate, sodium, potassium and ammonium persulfate, and others such as those disclosed in U.S. Pat. Nos. 2,471,959 and 2,491,471.

Particularly preferred as polymerization initiators are the water-soluble peroxygen compounds such as hydrogen peroxide, and the sodium, potassium and ammonium persulfates, the water-soluble oxidation-reduction or "redox" types of catalysts and the heavy metal activated, water-soluble peroxygen and redox catalysts. Included in this list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfite and dimethyl amino-propionitrile; the combination of a water-soluble peroxygen compound with a reducing sugar or with a combination of a dimercapto compound and a water-soluble ferricyanide compound and others. Heavy metal ions which greatly activate potassium persulfite and the redox catalyzed polymerizations include those of silver, copper, iron, cobalt, nickel and others. The preferred range of initiator is from about 0.01 to about 5 parts by weight per 100 parts by weight of monomers.

Although the polymerization can be carried out in the presence of air, the initiation period is longer and thus it is preferred to conduct the polymerization reaction in the substantial absence of oxygen by conducting it at reflux or in an inert atmosphere such as nitrogen or helium and the like. The temperature at which the polymerization is carried out is not critical; it may be varied widely from −30° C to 100° C or higher, though best results are generally obtained at a temperature in the range of from about 0° C to about 70° C. Although the pH of the polymerization system is not critical, it is preferred that a pH of about 6–8 be employed during the polymerization reaction. The final polymer latex may be adjusted to any desired pH. Other substances such as buffers, electrolyte salts, mercaptan modifiers, and the like can be incorporated in the polymerization mixture.

In the preferred process of this invention a monomer component which is in addition to the diene rubber and seed components comprised of at least 80 parts by weight of methacrylonitrile monomer and from zero to 20 parts of another monovinyl monomer per 100 parts of monomer component is polymerized in aqueous emulsion in the presence of a free radical initiator and in the presence of from about 5 to about 160 parts by weight of a seed polymer having an average particle size between about 300 and 1,000 A.

Preferred polymers used as the seed polymer are polymers prepared in aqueous emulsion and employed in the form of an emulsion in our polymerization process, and those preferred polymers include polymethacrylonitrile, copolymers of methacrylonitrile having up to 20 percent by weight in them of another monovinyl monomer, polystyrene, polymethyl acrylate, polymethyl methacrylate, polyacrylonitrile and acrylontrile copolymers containing up to 30 percent by weight of another monovinyl monomer and mixtures thereof.

The process of this invention is further illustrated in the following examples in which the amounts of ingredients and products are expressed in parts by weight unless otherwise indicated.

EXAMPLE 1

A. An acrylonitrile-butadiene elastomer was prepared in latex form using the following recipe:

| Ingredients | Parts |
|---|---|
| Butadiene-1,3 | 65 |
| Acrylonitrile | 35 |
| Water, distilled | 200 |
| t-Dodecyl mercaptan | 0.5 |
| Azo-bis-isobutyronitrile (AiBN) | 0.25 |
| Tallow fatty acid (T-11) | 0.60 |
| Hydrogenated rosin acid soap (Dresinate) | 0.675 |
| High molecular weight sodium salt of a sulfonated naphthalene condensate (Lomar D) | 0.20 |
| Sodium salt of N,N'(β-hydroxyethyl)glycine (chelating agent) | 0.05 |
| KOH | 0.14 |

The water, fatty acid, rosin soap, KOH, chelating agent and Lomar D were added to the reactor. This mixture was then heated to about 60° C and was stirred for about an hour. The mixture was then cooled to near room temperature, and the acrylonitrile and mercaptan were added. The butadiene was then charged, the mixture was brought to 50° C, the AiBN was added and the polymerization was carried out at 50° C with constant stirring. After 11 hours of reaction, the mixture was short-stopped with 0.06 parts of diethyl hydroxy amine (Pennstop RC 1,866) and the final conversion of monomer to polymer was 83 percent. The latex was stripped to a final total solids content of 31.9 percent. The final latex average particle size was 1,135 A as determined by an electron microscope.

B. A seed resin copolymer of methacrylonitrile and methyl methacrylate was prepared in latex form from the following ingredients:

| Ingredients | Parts |
|---|---|
| Methacrylonitrile | 95 |
| Methyl methacrylate | 5 |
| $K_2S_2O_8$ | 0.10 |
| n-Dodecyl mercaptan | 1.0 |
| GAFAC RE-610* (emulsifier) | 2.0 |
| Tetrapotassium salt of ethylene-diamine tetraacetic acid (chelating agent) | 0.05 |
| Water, distilled | 225 |

*a mixture of $R-O-(CH_2CH_2O-)_nPO_3M_2$ and $[R-O-(CH_2CH_2O-)_n]_2PO_2M$ wherein n is a number from 1 to 40, R is an alkyl or alkaryl group and preferably a nonylphenyl group and M is hydrogen, ammonia or an alkali metal, which composition is sold by GAF Corporation.

A solution of the GAFAC, chelating agent and water was prepared and the pH was adjusted to 6.7 with KOH. This solution was added to the polymerization reactor and the remaining ingredients were charged in the order of monomers, mercaptan, and $K_2S_2O_8$. The reactor was then purged with nitrogen and quickly brought to 60° C with constant stirring. The polymerization was carried out for 23 hours to give a latex having a total solids of 30.8 percent by weight which corresponded to a 98 percent conversion of monomers to polymer. This latex was used as seed in some of the subsequent Examples. The average particle size of this latex was 600 A as determined by electron microscopy. The polymerization rate for this latex was as follows:

| Polymerization Time (hours) | % Conversion |
|---|---|
| 2 | 1.8 |
| 4 | 16.2 |
| 6 | 42.6 |
| 7 ¼ | 64.5 |

C. This procedure describes the preparation of an impact resistant copolymer of methacrylonitrile and methyl methacrylate at an improved rate by the incorporation of a seed latex in accordance with this invention. The resin was prepared using the following ingredients:

| Ingredients | Parts |
|---|---|
| Methacrylonitrile | 95 |
| Methyl methacrylate | 5 |
| Water | 165 |
| GAFAC RE-610 (emulsifier) | 3 |
| n-Dodecyl mercaptan | 0.5 |
| t-Butyl peroxypivalate (catalyst) | 0.5 |
| Latex A of this example | 78.4 |
| Latex B of this example | 36.1 |

The amount of rubber latex (Latex A) shown above provided 25 parts of rubber per 100 parts of monomers. The amount of seed latex (Latex B) shown above provided 11.1 parts of seed resin per 100 parts of monomers or 10 parts of seed resin per 100 parts of final resin (not including rubber) calculated at 100 percent conversion. The emulsifier and water were mixed and pH of the mixture adjusted to 7 with KOH; both the rubber and seed latex were then added and well mixed. The monomers and remaining ingredients were then added and the charged reactor was thoroughly purged with nitrogen. The polymerization reaction was conducted at 60° C with constant agitation for 24 hours. Latex samples were withdrawn at intervals for determination of total solids content from which monomer conversion was calculated.

D. A series of polymerizations was carried out in the manner described in C except that the amount of seed latex (Latex B) was varied. A control polymerization containing no seed latex (Latex B) was included in this series. In all cases the amount of rubber (Latex A) was held constant at 25 parts rubber per 100 parts monomers. Conversion data for this series are shown in Table I and curves plotted in FIG. 1 of the drawing. Only data obtained during the first 8 hours of the polymerization reaction are shown in FIG. 1.

TABLE I

| Parts of Seed Resin Per 100 parts Monomer | Per 100 parts Total Resin | Hours of Reaction | % Conversion |
|---|---|---|---|
| 0 | 0 | 1 | 6 |
| | | 2 | 12 |
| | | 2.5 | 15 |
| | | 3.5 | 20 |
| | | 4.5 | 24 |
| | | 5.5 | 33 |
| | | 7.5 | 48 |
| | | 24 | 98 |
| 11.1 | 10 | 1.5 | 10 |
| | | 4 | 31.5 |
| | | 5.5 | 44 |
| | | 7 | 68 |
| | | 24 | 100 |
| 25 | 20 | 1.5 | 27 |
| | | 4 | 53 |
| | | 5.5 | 86.5 |
| | | 7 | 99 |
| 42.9 | 30 | 1.5 | 25 |
| | | 4 | 87 |
| | | 5.5 | 93 |
| | | 7 | 99 |
| 66.7 | 40 | 1.5 | 30 |
| | | 4 | 87.5 |
| | | 5.5 | 100 |
| 100 | 50 | 1.5 | 36.5 |
| | | 4 | 92.5 |
| | | 5.5 | 99 |
| 150 | 60 | 1.5 | 64 |
| | | 4 | 94.5 |
| | | 5.5 | 100 |

EXAMPLE 2

Figure 2:
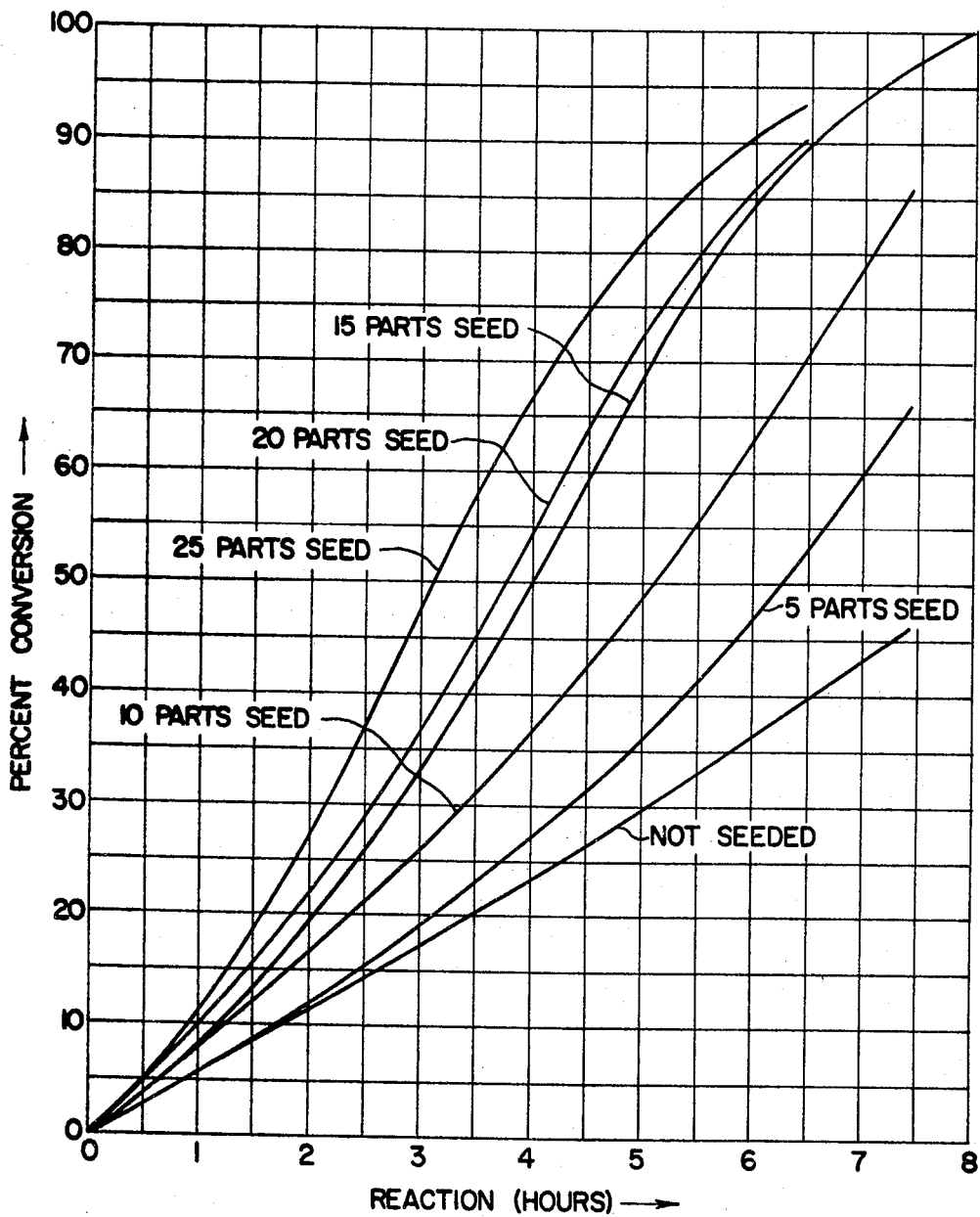

The procedures described in Example 1 were repeated except in Example 1D the amount of seed latex (Latex B) was further varied. The results are given in Table II and in FIG. 2 of the drawing.

TABLE II

| Parts Seed Resin Per 100 parts Monomer | Per 100 parts Final Resin | % Conversion | Hours of Reaction |
|---|---|---|---|
| 5.3 | 5 | 7.5 | 1.5 |
| | | 20.5 | 3 |
| | | 35 | 5 |
| | | 67 | 7.5 |
| | | 100 | 24 |
| 11.1 | 10 | 18 | 2 |
| | | 42 | 4.5 |
| | | 87 | 7.5 |
| | | 98 | 24 |
| 17.6 | 15 | 3 | 33 |
| | | 5 | 69 |
| | | 6.5 | 90 |
| | | 8 | 100 |
| 25.0 | 20 | 2 | 22 |
| | | 4.5 | 64 |
| | | 6.5 | 90 |
| | | 8 | 96 |
| 33.3 | 25 | 1.5 | 18 |
| | | 3 | 48 |
| | | 5 | 81 |
| | | 6.5 | 93.5 |
| | | 8 | 97 |

EXAMPLE 3

A copolymer resin was prepared by polymerizing 95 parts methacrylonitrile and 5 parts methyl methacrylate in the presence of 25 parts of butadiene-acrylonitrile rubber per 100 parts of final resin at 100 percent conversion in accordance with the procedure of Example 2 with the exception that the polymerization was carried out at 70°C. Conversion data are given in Table III.

TABLE III

| Polymerization Time | % Conversion |
| --- | --- |
| 2 hours | 21 |
| 5 hours | 62 |
| 8 hours | 93 |

Figure 3:
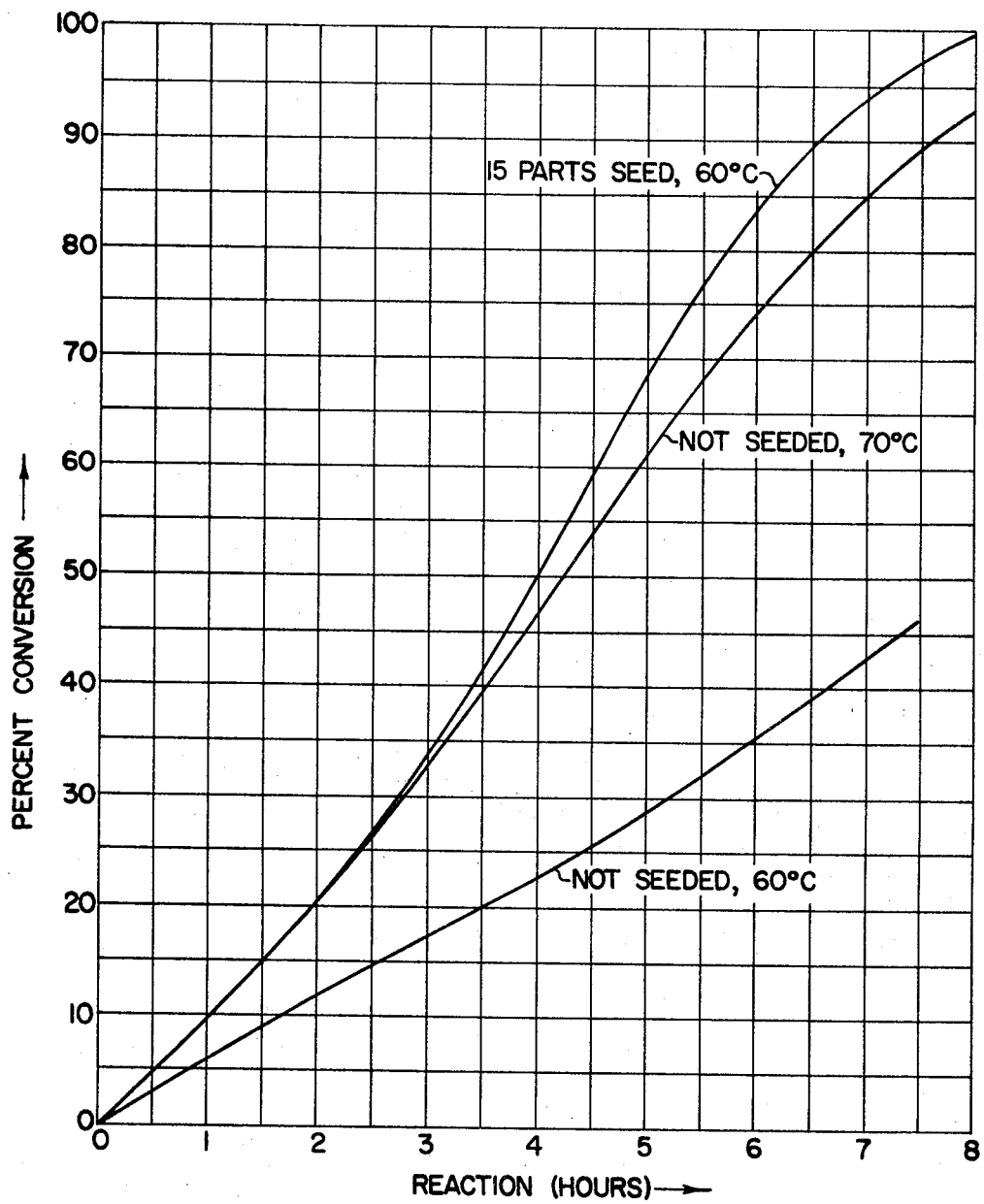

FIG. 3 shows a plot of conversion vs. polymerization time for this polymer as well as that for a similar polymer seeded with 15 parts of seed resin (Latex B of Example 1) per 100 parts of final resin at 100 percent conversion prepared at 60° C and an unseeded polymer prepared at 60° C. It can be seen from FIG. 3 that a greater improvement in polymerization rate for a given polymer is realized by the use of 15 parts of seed latex than is gained by a 10° C increase in polymerization temperature. Improved resin color and stability are found in the resin prepared at the lower temperature.

EXAMPLE 4

A. A series of hompolymers and copolymers was prepared for subsequent use as seed latex from the following ingredients:

| Ingredients | Parts |
| --- | --- |
| Monomer | 100 |
| K₂S₂O₈ | 0.06 |
| n-Dodecyl mercaptan | 1.0 |
| Chelating agent | 0.05 |
| GAFAC RE-610 | 3 |
| Water, distilled | 200 |

The procedures of Example 1B were followed and the polymerizations were carried out at 60° C. Polymers prepared in this manner include polystyrene, polymethyl methacrylate, polymethyl acrylate, and a copolymer of 75 parts acrylonitrile and 25 parts methyl acrylate. Polymethacrylonitrile was also prepared in the above manner except that t-butyl peroxypivalate (0.5 parts) was used as initiator in place of the K₂S₂O₈.

B. Each of the resin latices of A of this example was used to seed a polymerization of methacrylonitrile in the presence of 25 parts of rubber (Latex A of Example 1) per 100 parts of final resin at 100 percent conversion. The seed resin in each case was used at a level of 20 parts per 100 parts of resin or 25 parts per 100 parts of monomer using the following ingredients:

| Ingredients | Parts |
| --- | --- |
| Methacrylonitrile | 100 |
| t-Butyl peroxypivalate | 0.5 |
| n-Dodecyl mercaptan | 0.5 |
| GAFAC RE-610 | 3 |
| Water, distilled | 280 |

Figure 4:
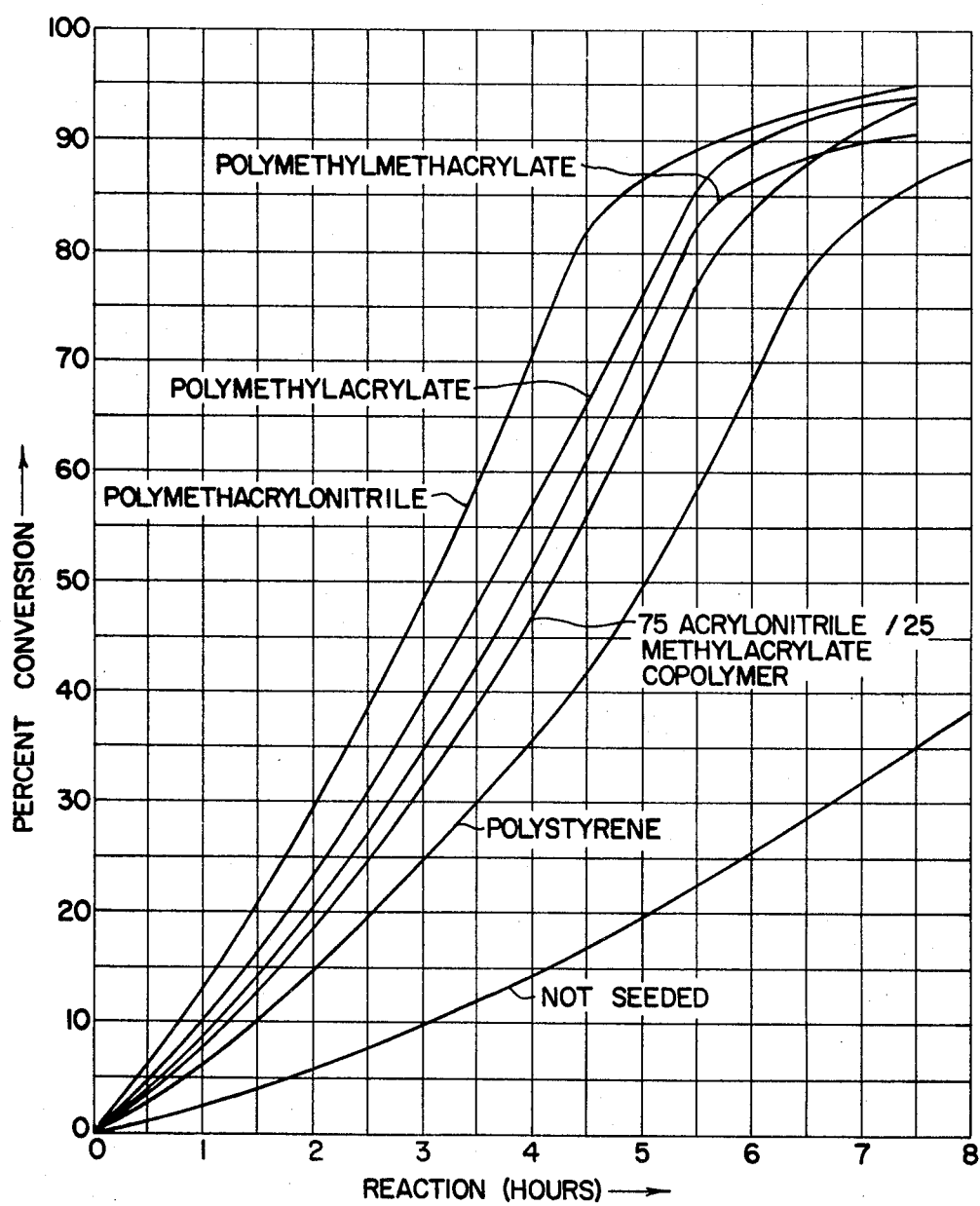

Conversion data and properties of the final resins are shown in Table IV and are plotted in FIG. 4 of the drawing.

TABLE IV

| Composition of Seed | Seed Particle Size, A | Reaction Time Hours | % Conversion | Notched Izod Impact |
| --- | --- | --- | --- | --- |
| Polymethacrylonitrile | 570 | 1.5 | 20 | |
| | | 2.5 | 39 | |
| | | 4.5 | 82.5 | |
| | | 6.5 | 92 | |
| | | 8 | 95 | 3.3 |
| Polystyrene | 654 | 1.5 | 9.5 | |
| | | 2.5 | 21 | |
| | | 4.5 | 42 | |
| | | 6.5 | 79 | |
| | | 8 | 89 | 5.8 |
| Polymethyl acrylate | 500 | 2 | 22.5 | |
| | | 3.5 | 47 | |
| | | 5.5 | 86 | |
| | | 7.5 | 94 | 2.7 |
| Polymethyl methacrylate | 582 | 2 | 21 | |
| | | 3.5 | 42.5 | |
| | | 5.5 | 84.5 | |
| | | 7.5 | 91 | 0.8 |
| Acrylonitrile/methylacrylate | 795 | 2 | 19 | |
| | | 3.5 | 39 | |
| | | 5.5 | 78 | |
| | | 7.5 | 94 | 1.2 |
| Control (no seed) | | 1.5 | 6 | |
| | | 2.5 | 8 | |
| | | 4.5 | 17 | |
| | | 6.5 | 27 | |
| | | 8 | 39 | 5.8 |

EXAMPLE 5

Because the graft polymerization of this process minus resin seed is in essence also a seeded polymerization, the polymerization rate of the graft polymerization can be varied by varying the particle size of the rubber latex particles. The average particle size of the rubber can be varied by varying the amount of emulsifier used in the preparation of the rubber latex.

Using Latex A of Example 1 as a standard rubber recipe, additional rubber latices were prepared by the procedure of Example 1A in which the emulsifier level was doubled and quadrupled. Particle size of the latices was found by electron microscopy to be the following:

| Emulsifier Level | Average Latex Particle Size A. |
| --- | --- |
| 1 | 1100 |
| 2 X | 700 |
| 4 X | 450 |

The procedures of Example 1C were followed using each of the foregoing rubbers. The average conversion rate (percent conversion per hour) was determined and all polymerizations were allowed to go to essentially complete conversion. The final resin latices were coagulated with aqueous aluminum sulfate solution; the polymer was washed, dried and compression molded at 180° C and 4,000 psi into test bars. All samples were clear and of a very light yellow color. Notched Izod impact strengths were determined for each sample.

Polymerization rates were as follows:

| Emulsifier Level | Average Polymerization Rate (% conversion/hour) | Notched Izod Impact (foot pounds/inch notch) |
| --- | --- | --- |
| 1 | 6.2 | 8 |
| 2 X | 7.3 | 2 |
| 4 X | 11.1 | 0.5 |

It can be seen that as the particle size of the rubber is reduced the polymerization rate of the graft resin increases but impact strength decreases.

It can be shown, however, that by using the large particle size rubber to obtain impact strength, but using an amount of seed resin to control polymerization rate, the desired rate increases can be achieved by little or no loss of impact strength (see Table V) per the procedure of Example 2.

TABLE V

| Parts Seed | Parts Rubber | Average Notched |

| Per 100 parts Total Resin | Per 100 parts Total Resin | Polymerization Rate (%/hour) | Izod Impact |
|---|---|---|---|
| 0 | 25 | 6.2 | 8 |
| 5 | 25 | 8.9 | 7 |
| 10 | 25 | 11.6 | 6 |
| 15 | 25 | 13.8 | 5 |
| 20 | 25 | 14.0 | 4 |
| 25 | 25 | 14.5 | 3 |

Figure 5:
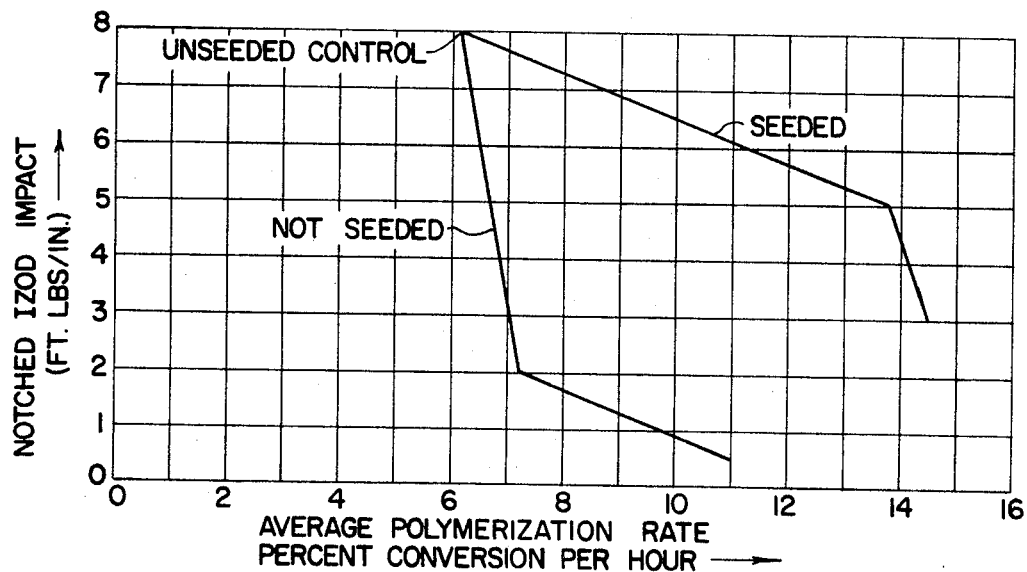

FIG. 5 shows that impact loss accompanying rate improvement can be minimized by the use of proper resin seeding technique.

EXAMPLE 6

This example demonstrates that the variation in emulsifier level has little or no effect on the polymerization rate of a mixture of 95 parts methacrylonitrile/5 parts methyl methacrylate in the presence of 25 parts rubber with and without seed latex in accordance with the procedure of Example 1C. The results are shown in Table VI.

TABLE VI

| Parts Emulsifier | Polymerization Rate (% per hour) | Parts Seed Latex Present |
|---|---|---|
| 1 | 3.5 | 0 |
| 2 | 3.6 | 0 |
| 3 | 4.1 | 0 |
| 1 | 11.7 | 10 |
| 2 | 11.8 | 10 |
| 3 | 10.2 | 10 |

We claim:

1. A process for the preparation of impact resistant, rubber modified methacrylonitrile homopolymers and copolymers at improved polymerization rates comprising polymerizing in aqueous emulsion a monomer component of at least 80 parts by weight of methacrylonitrile monomer and from zero to 20 parts by weight of at least one other monomer selected from the group consisting of methyl acrylate, methyl methacrylate, and styrene per 100 parts by weight of monomer component in the presence of a free radical initiator, from 1 to 40 parts by weight of a preformed diene rubber which is a polymer of a conjugated diene and a comonomer selected from the group consisting of a vinyl aromatic monomer and a monomer of the structure

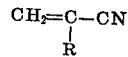

wherein R is hydrogen, a lower alkyl group having from one to four carbon atoms, and halogen, said diene rubber having an average particle size of from about 800 to about 2,000 A, and from about 5 to about 160 parts by weight of a seed polymer having an average particle size of from about 300 to about 1,000 A, said seed polymer being at least one member selected from the group consisting of polymethacrylonitrile, copolymers of methacrylonitrile with up to about 20 percent by weight of another monovinyl monomer, polystyrene, polymethyl acrylate, polymethyl methacrylate, polyacrylonitrile, and acrylonitrile copolymers with up to 30 percent by weight of another monovinyl monomer.

2. The process of claim 1 wherein the diene rubber is a copolymer of butadiene and acrylonitrile containing from 50 to 90 percent by weight of polymerized butadiene and from 10 to 50 percent by weight of polymerized acrylonitrile.

3. The process of claim 2 wherein the seed polymer is a copolymer of 95 percent by weight of methacrylonitrile and 5 percent by weight of methyl methacrylate.

4. The process of claim 2 wherein the seed polymer is polystyrene.

5. The process of claim 2 wherein the seed polymer is polymethyl acrylate.

6. The process of claim 2 wherein the seed polymer is polymethyl methacrylate.

7. The process of claim 2 wherein the seed polymer is a copolymer of 75 percent by weight acrylonitrile and 25 percent by weight methyl acrylate.

* * * * *